Jan. 10, 1967   J. E. GAGNON ETAL   3,296,957
DRIP COLLECTING MEANS FOR BARBEQUE
Filed April 14, 1964

Inventors
James E. Gagnon
Michael J. Lawrence
By Thomas F. Kirby
Attorney

United States Patent Office 3,296,957
Patented Jan. 10, 1967

3,296,957
DRIP COLLECTING MEANS FOR BARBEQUE
James E. Gagnon, 1823 Lyndale Ave., and Michael J. Lawrence, 2643 Monroe St., both of Eau Claire, Wis. 54701
Filed Apr. 14, 1964, Ser. No. 359,585
3 Claims. (Cl. 99—444)

This invention relates generally to barbeque devices having a rotatable spit. More particularly, it relates to improved collecting means for use with devices of the aforesaid character for collecting fats, juices and drippings from foods being cooked on the spit thereof.

In barbeque devices of the type wherein a bed of coals is disposed beneath a rotating spit, drippings from the food being cooked fall into the hot coals to cause an uncontrollable fire which is hazardous and also chars the food. In addition, tasty drippings usable for basting and for gravies and sauces are wasted.

It is an object of the present invention to provide improved collecting means for use with barbeque devices to collect drippings from the food being cooked thereby reducing the problem of fire flareups and saving the drippings for further use.

Another object is to provide collecting means of the aforesaid character which are self-supporting when placed in the fire bowl of barbeque devices and also when removed therefrom and placed on a horizontal surface such as a table.

Another object is to provide collecting means of the aforesaid character which are economical to manufacture and easy to use.

Other objects and advantages of the invention will hereinafter appear.

The accompanying drawing illustrates a preferred embodiment of the invention but it is to be understood that the embodiment illustrated is susceptible of modifications with respect to details thereof without departing from the scope of the appended claims.

Figure 1:
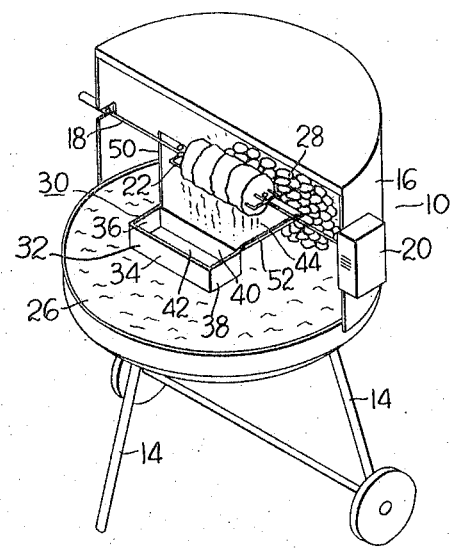
FIGURE 1 is a perspective view of a barbeque device employing collecting means incorporating the present invention.
Figure 2:
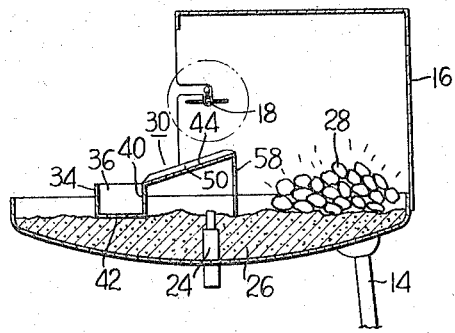
FIGURE 2 is a cross-sectional view taken along a line through the center of the barbeque device and collecting means shown in FIG. 1.

Referring to FIGS. 1 and 2, the numeral 10 designates a barbeque device of the type with which the present invention is advantageously employed. Barbeque device 10 comprises a fire bowl 12 which is supported by suitable legs 14 and is provided, for example, with means such as a hood 16 which supports a rotatable spit or skewer 18 adapted to be rotated, for example, by an electric motor 20. Spit 18 is, for example, provided with means such as the prongs 22 for securing food, such as a roast 23, disposed on the spit against rotation. Fire bowl 12 of barbeque device 10 is shown in FIG. 2 as being provided with means such as an upwardly projecting member 24 which, it is to be understood, is adapted to support a removable grill (not shown) which can be employed to support food being cooked.

Fire bowl 12 of barbeque device 10 is shown in FIGS. 1 and 2 as partially filled with fire bed material 26, such as sand, gravel, stone, or a fire-proof absorptive material, upon which a bed of coals 28 is laid.

Figure 3:
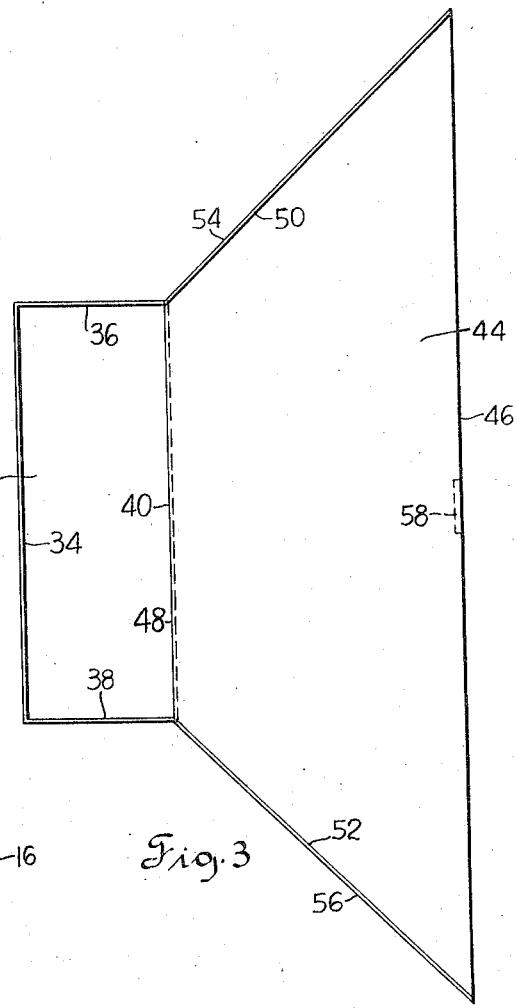
FIGURE 3 is an enlarged top plan view of the collecting means shown in FIG. 1 and 2.

In accordance with the present invention there is provided a collecting means 30 which is disposed within the fire bowl 12 and is supported on the fire bed material 26. Referring to FIGS. 1, 2 and 3, collecting means 30 comprises a receptacle portion 32 for receiving drippings. Receptacle portion 32 is shown as having four side walls 34, 36, 38 and 40 and a flat bottom surface 42 but, it is to be understood, could have some other configuration. Collecting means 30 further comprises a collecting portion 44 which extends upwardly at an angle from the top edge of the side wall 40 of receptacle portion 32; the angular disposition thereof facilitating the flow of drippings down the top surface of the collecting portion. Collecting portion 44 of collecting means 30 is in the form of a trapezoid with its edge 46 being longer than its edge 48 which is attached to side wall 40 of receptacle portion 32. Upturned flanges 50 and 52 are provided along the side edges 54 and 56, respectively, of collecting portion 44 of collecting means 30 to prevent run-off of the drippings from the edges. Trapezoidal configuration of collecting portion 44 assures collection of all drippings and still allows maximum upward flow of heat from the coals. Supporting means such as a downwardly depending leg 58 are connected to the collecting portion 44 to prevent collecting means 30 from tipping when in the fire bowl 12 or when placed on a horizontal surface such as a table. Leg 58 is shown as attached to edge 46 of collecting portion 44 but, as will be understood, the supporting means could be located elsewhere on collecting portion 44 provided it is so located and is of such length as to prevent tipping.

It is to be understood that collecting means 30 is made of fire resistant material such as metal and may be fabricated by being punched and drawn from sheet metal. Or, it may be punched from sheet metal, folded and welded to provide the configuration shown in the drawing.

Collecting means 30 is employed as follows. Assume that the bed of coals 28 in the barbeque device 10 is ignited, that roast 23 on spit 28 is being rotated, and that fats, juices and drippings are falling vertically from the roast. Collecting means 30 is then placed within fire bowl 12 so that the flat bottom surface 42 of receptacle portion 32 and the bottom end of leg 58 rest on the fire bed material 26 in the fire bowl. Collecting means 30 is positioned so that collecting portion 44 extends beneath roast 23 to catch the drippings therefrom. As FIG. 2 shows, collecting portion 44 does not completely shield the roast from direct exposure to the coals. The drippings falling into collecting portion 44 are channelled down the sloping surface thereof and collect in receptacle portion 32 of collecting means 30. The flanges 50 and 52 along the side edges of collecting portion 44 prevent the drippings from running off the sides thereof. Thus, drippings are prevented from falling into the bed of coals 28 to cause flareups and, furthermore, are collected for further use.

When roast 23 is thoroughly cooked, collecting means 30 may be removed from the fire bowl 12 and, because it is self-supporting and stable, may be placed on a table while the drippings collected in receptacle portion 32 are removed or mixed with other ingredients.

What is claimed is:

1. An article of manufacture fabricated from a single sheet of metal and for use as a dripping collecting means with a spit type barbeque device, comprising a receptacle portion having a bottom, a pair of integrally formed upwardly extending end walls, and a pair of integrally formed upwardly extending side walls, a collecting portion integrally formed with and extending in upwardly sloping relationship from the top edge of one of said side walls, said collecting portion having a pair of side edges and integrally formed upwardly extending flanges therealong, said collecting portion further having an edge remote from its attached edge which is longer than its attached edge, and at least one supporting member integrally formed with and extending downwardly from said collecting portion, said member being of such a length as to reach a flat horizontal plane in which said bottom of said receptacle portion lies when said member is disposed transverse to said bottom.

2. An article of manufacture according to claim 1 wherein said member is a single leg integrally formed with said remote edge of said collecting portion.

3. An article of manufacture according to claim 2 wherein said bottom of said receptacle portion is flat.

References Cited by the Examiner

UNITED STATES PATENTS

| | | | |
|---|---|---|---|
| 2,797,633 | 7/1957 | Goodwin | 99—421 |
| 2,815,707 | 12/1957 | Morrow | 99—421 |
| 3,062,128 | 11/1962 | Louthan | 99—421 X |
| 3,106,886 | 10/1963 | Layman | 99—421 |
| 3,127,828 | 4/1964 | Fine | 99—446 |
| 3,175,549 | 3/1965 | Bergsten | 99—421 X |

FOREIGN PATENTS

| | | |
|---|---|---|
| 850,083 | 9/1960 | Great Britain. |
| 360,474 | 4/1962 | Switzerland. |

WALTER A. SCHEEL, *Primary Examiner.*

S. P. FISHER, *Assistant Examiner.*